United States Patent [19]

Hammond et al.

[11] Patent Number: 4,510,856
[45] Date of Patent: Apr. 16, 1985

[54] MANUFACTURE OF CHEDDAR AND LIKE CHEESE

[75] Inventors: Leslie A. Hammond, Beaumaris; Norman H. Freeman, Moorabbin, both of Australia

[73] Assignee: Australian Dairy Corporation, Australia

[21] Appl. No.: 444,025

[22] Filed: Nov. 23, 1982

[30] Foreign Application Priority Data

Dec. 9, 1981 [AU] Australia .............................. PF1885

[51] Int. Cl.$^3$ .............................................. A01J 25/00
[52] U.S. Cl. ........................................ 99/457; 99/459; 99/464; 99/465; 100/116; 100/118
[58] Field of Search ........................ 99/452, 456–459, 99/460, 461, 464–466; 100/110, 116, 118, 151; 426/36, 478, 582

[56] References Cited

U.S. PATENT DOCUMENTS 2,768,083  10/1956  Hensgen .............................. 99/456
3,570,389  3/1971  Pontecorvo ...................... 99/464 X
3,695,893  10/1972  Czulak et al. ...................... 99/458 X Primary Examiner—Timothy F. Simone
Attorney, Agent, or Firm—Sughrue, Mion, Zinn, Macpeak, and Seas

[57] ABSTRACT

A method and apparatus for use in the manufacture of cheeses which proceed through a cheddaring stage. The method comprises treating a pre-drained and stirred cheese curd with a compressive and shear force so as to simultaneously expel the residual whey and permit fibrous development to occur in the fused curd. The apparatus for achieving this comprises a weighted shear assembly, such as a continuous belt overlying a portion of the conveyor belt upon which the cheese curd is conveyed in the direction indicated by the arrows. The cheese curd is subjected to compressive and shear forces as it passes beneath the continuous belt. The apparatus for prestirring the curd prior to passing under the continuous belt may comprise a plurality of adjustable position stirrers which move above the conveyor belt in the forward and reverse direction of the conveyor belt.

10 Claims, 5 Drawing Figures

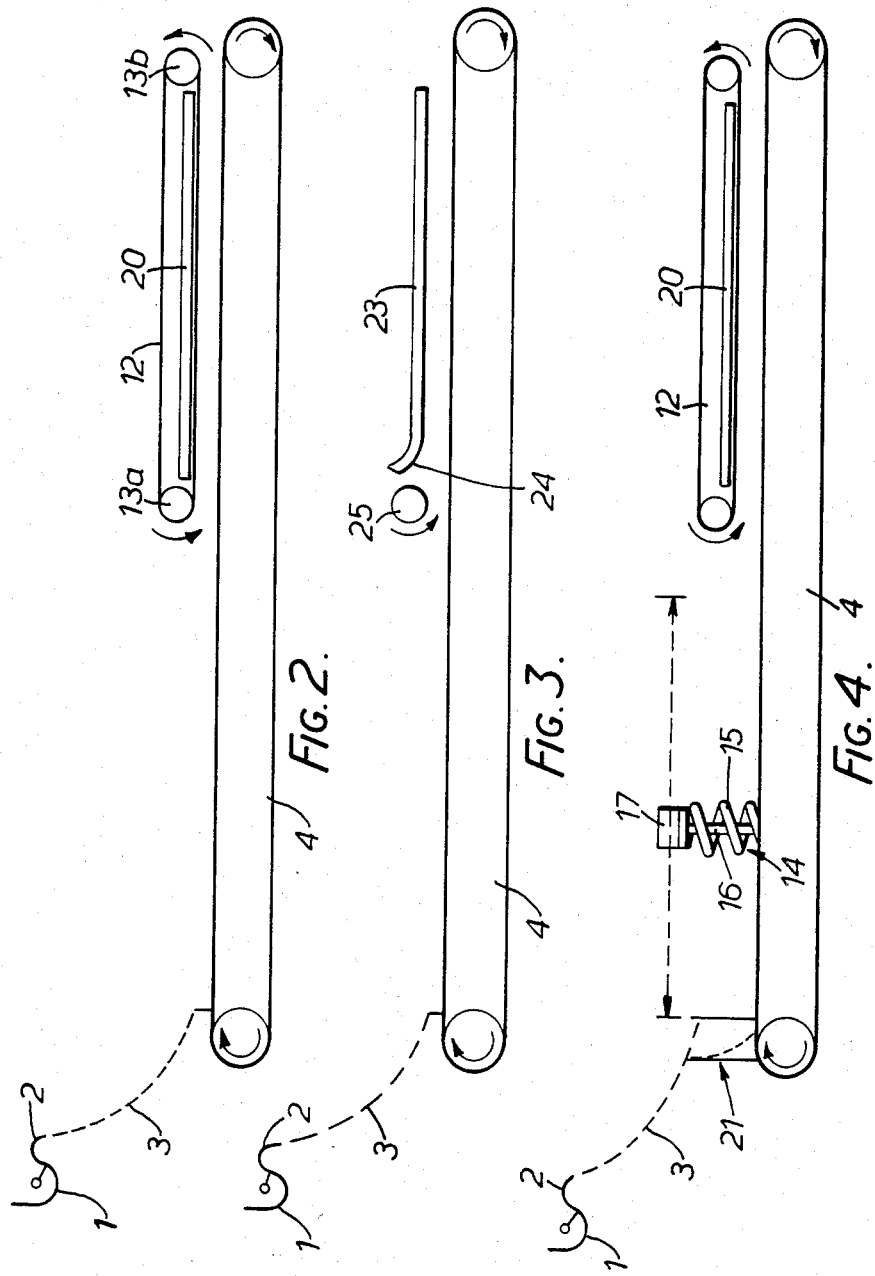

MANUFACTURE OF CHEDDAR AND LIKE CHEESE

This invention relates to improvements in the manufacture of cheeses, particularly Cheddar and like varieties such as Cheshire, Liecester, Gloucester, Chester, Derby, Wensleydale and Lancashire where there is a cheddaring stage in the process; and its principal object is to provide an improved apparatus and method for draining whey from curd and fusing the curd prior to milling in a shortened traditional cheese manufacturing process.

In the traditional manufacture of Cheddar cheeses, milk, rennet and "starter" (ie. one or more microorganisms selected from Streptococcus sp.) are stirred together. The coagulum is then cut, stirred and heated before whey is drained from the curd. The curd is then allowed or induced to fuse and flow to consolidate prior to milling into particles or chips of about finger size. In this process, it is essential to obtain proper separation of the curd from the whey if high quality, low moisture cheese is to be produced. On the other hand, it is equally true that cheese quality is dependent upon the manner in which this separation is achieved. For, if the curd is allowed to fuse before adequate drainage takes place and has to be freed by vigorous mechanical action, the resultant maceration of the lumps of fusing or fused curd will result in a serious loss of yield and quality through loss of fat and other cheese components. Consequently, it is generally recognized that good results will be obtained by allowing the free liquid to drain from the curd with occasional stirring in a vat and then manually turning sections of the curd to free the residual liquid. Whether the curd is in fact turned by hand or by mechanical means, the process is essentially batch rather than continuous in type; but with the advent of continuous machinery for milling and salting the curd (as in Australian Patent Specification No. 248,181), a satisfactory means for automatically separating curd from whey continuously was considered desirable. This was effectively achieved and is the subject of Australian Patent Specification No. 424,446. Essentially, what this patent specification describes is a method for draining liquid from a cheese curd/liquid (whey) mixture in a continuous process which comprises the steps of feeding the liquid (whey) and curd mixture over a screen at a first separation stage to permit the free liquid (whey) to drain from the curd through the screen, and then feeding the curd and liquid (whey) entrained therewith by means of a moving conveyor in a second separation stage while continuously lifting portions of the curd to allow and facilitate the freeing of the entrained liquid (whey) from the curd and its drainage from the conveyor.

The patent specification also includes apparatus for draining liquid (whey) from a cheese curd/liquid (whey) mixture comprising first separation means to effect an initial separation of liquid (whey) from the curd, a conveyor to receive curd and remaining liquid (whey) from said first separation means, said conveyor being adapted to cause or permit liquid (whey) to drain from the curd, and curd lifting means arranged to apply a lifting force to the curd on the conveyor to thereby facilitate drainage of the liquid from the curd, while providing gentle mechanical working of the curd to encourage expulsion of whey from the individual particles and the mass.

While this and similar methods and apparatus have been adequate in the traditional manufacture of Cheddar and like cheeses, it has been less than effective in the most recent modification of such traditional manufacture which is the subject of our co-pending Australian Patent Application No. PE 7502/81, the full disclosure of which is incorporated herein by this reference.

In brief, our co-pending application describes a "short method" cheese making process in which *Streptococcus thermophilus* is added to milk together with one or more of *Streptococcus lactis, Streptococcus cremoris* and *Streptococcus diacetilactis*, the resultant curd when firm being cut and stirred with the whey and cooked by raising the temperature gradually to about 38° C. over a period of about thirty five to forty five minutes and maintaining that temperature for about 25 minutes as in the traditional process, and in which about one half of the whey is then optionally drained off and the temperature of the residual whey and of the curd is then raised over a period of about ten minutes to a temperature between about 40° and 49° C. for about 25 minutes, a second cooking being thus effected, and in which the residual whey is then drained from the curd in the vat and the curd is cheddared in the vat at this higher temperature for about half an hour and, after such cheddaring, is treated at temperatures (initially the temperature of the second cooking) which are about 3° to 11° C. higher than in the traditional process but otherwise in accordance with the process by cutting into strips or other large particles, salting, stirring and forming into blocks.

It was found that when such a "short method" cheese making process was carried out in the continuous machines developed for the processing of traditional Cheddar, the drainage of curd was insufficient to remove all the free whey. This problem could not be solved by merely increasing the amount of stirring using the conventional peg stirrers since this had such deleterious effects as increasing losses of butter fat and fine particles, and retarding fibre development in the curd with the result that upon the curd being milled there was an appreciable amount of crumbling.

It is therefore an object of the present invention to overcome this problem.

Accordingly, in one aspect of the present invention there is provided a method for draining residual whey from a previously drained and stirred cheese curd and subsequently enabling fibrous development in the curd to occur, during the manufacture of Cheddar and like cheeses, which comprises subjecting a previously drained and stirred curd to a simultaneous compressive and shear force in such a manner that residual free whey is expelled and the curd is fused with effective fibrous development.

In another aspect, the present invention provides an apparatus for draining whey from a previously drained and stirred cheese curd and subsequently enabling fusion and fibrous development in the curd to occur, during the manufacture of Cheddar and like cheeses, which apparatus comprises the combination of a conveyor belt for conveying cheese curd to a cutting or milling station, and a weighted shear assembly, said weighted shear assembly comprising either a continuous belt or skid plate spaced from and over-lying a portion of said conveyor belt, the arrangement and construction being such that when the previously drained and stirred curd is conveyed by said conveyor belt beneath said weighted shear assembly, it is subjected to compressive and shear forces exerted by said weighted shear assembly which expels the residual whey and accelerates fusion and fibrous development in the curd.

When the weighted shear assembly is a weighted belt, it is preferably in the form of a continuous belt arranged parallel to the conveyor, its lower run preferably being driven in the same direction as that of the conveyed curd but at a different speed. Ideally, the weighted belt exerts its force by virtue of its own weight, that is, it is arranged to rest upon the curd.

When the weighted shear assembly is a skid plate, it is preferably in the form of a rectangular stainless steel plate arranged parallel to the conveyor and including a curved leading edge so as to aid the progress of the curd underneath it.

The cheese curd/whey mixture is drained and stirred prior to the application of compressive and shear forces by means of a plurality of adjustable position stirrers adapted to travel above the conveyor belt in the forward and reverse direction of the movement of the conveyor belt to effect a stirring of the curd/whey mixture in order to aid and accelerate the removal of the whey therefrom, each said stirrer being in the form of a spiral flat blade adapted for rotation about a central, generally perpendicular axis, and being adapted to stir the curd within about one minute of the curd leaving the drainage screen and meeting the conveyor.

The stirrers may be arranged in a bank extending across the conveyor belt and be supported by a common structure which moves on side rails in the forward and reverse directions of the direction of movement of the conveyor belt. In one arrangement, the stirrers travel from the position at which the cheese curd/whey mixture meets the conveyor to a position approximately one meter from the weighted belt to allow some initial settling prior to compression. The bottom horizontal parts of the blades of the stirrers preferably sweep within 5 mm of the conveyor belt to lift and prevent the curd from settling and blocking the perforations in the belt. The stirrers also mix the curd so that the mass has a homogenous make up and the drained curd is levelled to ensure the most effective operation of the weighted belt.

Since it is necessary for the stirrers to act upon the drained curd within about 1 minute of it passing onto the conveyor belt, a scalloped plate is preferably fitted at the end of the conveyor belt where the curd passes from the drainage screen onto the conveyor belt. This design prevents curd fusing in blank spaces not swept by the stirrers.

In order that the invention may be more clearly understood, preferred embodiments thereof will now be described with reference to the accompanying drawings, in which:

FIG. 2 is a schematic illustration of the weighted belt/conveyor belt apparatus;

FIG. 3 is a schematic illustration of the skid plate/conveyor belt apparatus;

FIG. 4 is a schematic illustration of a combined weighted belt/conveyor belt and stirring apparatus.

Figure 1:
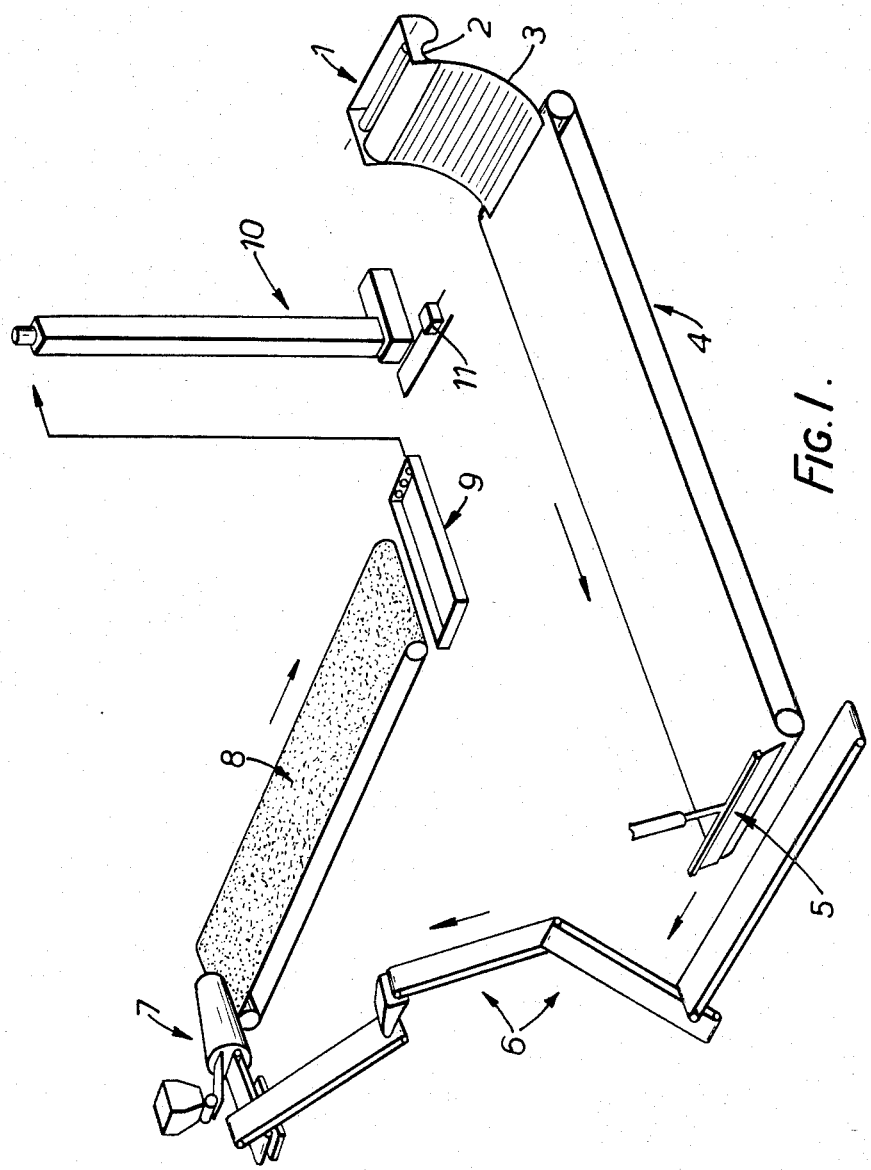
FIG. 1 is a schematic illustration of the plant used for Cheddar cheese making.

FIG. 1 is provided in order to indicate the relative position of the apparatus of the invention in a Cheddar cheese making plant. Basically, the plant comprises a trough 1 with agitator from which a curd/whey mixture is fed via a weir 2 over a sloping screen 3 to a conveyor 4. The curd is milled at 5 and transferred by various transfer belts 6 to a salting station 7, then along a conditioning belt 8, a vibrator 9, and finally, Wincanton block forming towers 10 (one of which is illustrated). The final product emerges at 11.

One aspect of the present invention, as depicted in FIG. 2, resides in the provision of a weighted belt 12, spaced from and arranged above the conveyor belt 4. The weighted belt is preferably driven about hollow cylindrical stainless steel rollers 13a and 13b in the direction indicated by the arrows, that is, counter-clockwise as viewed in FIG. 2, since this means that the bottom run of the weighted belt will travel in the same direction to the top run of the conveyor, thereby providing an effective shearing action on the curd. In practice, it has been found that the speed of the weighted belt should be greater than the speed of the conveyor belt by about 10–30% in order to achieve the best results. The speed, however, is not critical to the operation of the arrangement and can vary quite substantially with still very significant beneficial results. Furthermore, the weighted belt could even be driven in a clockwise direction if need be.

The weighted belt 12 may take the form of a continuous perforated or unperforated or woven band of metal, rubber, plastics or like material, or comprise a series of transverse slats of a suitable material such as stainless steel. The shear belt arrangement is supported by a frame (not shown) which preferably permits the belt to have a predetermined amount of free movement in a perpendicular direction above the conveyor belt 4. This freedom of movement is such that the entire weight of the weighted belt and its attachments can be transferred to the curd as it passes along the conveyor belt beneath the weighted belt, thereby providing the necessary compressive and shear forces to squeeze the residual whey from the mixture and compress the curd to permit fusion and fibrous development to occur.

The weight applied by the weighted belt can conveniently be adjusted by adding water to the hollow cylindrical stainless steel rollers 13a and 13b or by mechanical pressure applied to the rollers.

In order to prevent the upward displacement of the lower run of the weighted belt, a stainless steel backing plate 20 is preferably positioned on the inside of the lower run as illustrated.

A further aspect of the present invention is depicted in FIG. 3. Here the weighted shear assembly is in the form of a skid plate 23 having a curved leading edge 24. The skid plate is preferably manufactured from stainless steel and is adapted to transmit pressure applied by suitable means to its upper surface, for instance by weights or the like, to the surface of the curd passing beneath it. An idler roller 25 may be provided to assist the curd as it passes beneath the skid plate.

Figure 5:
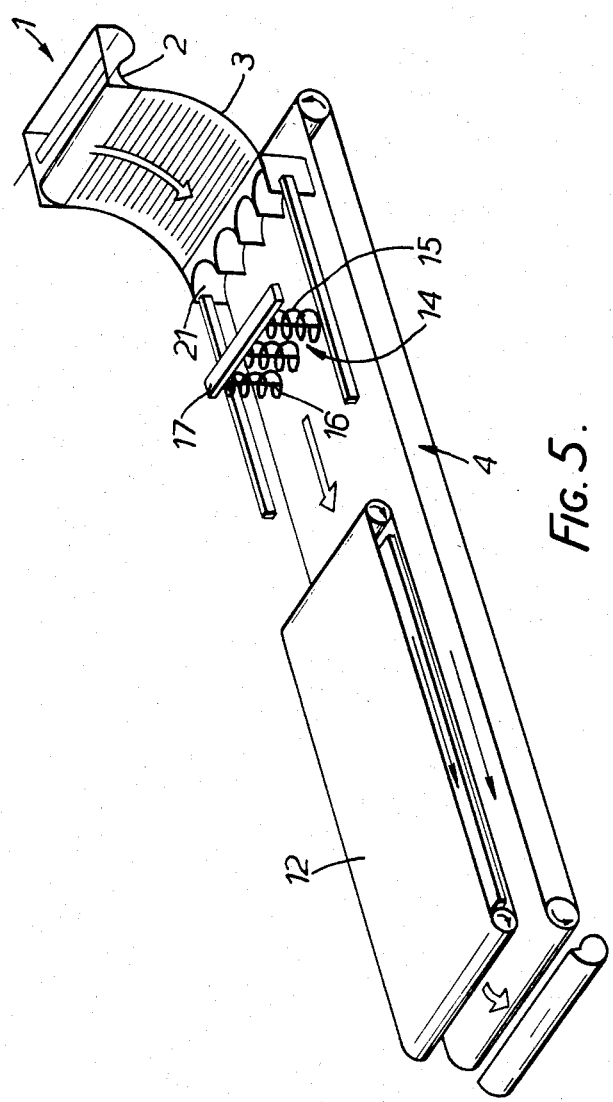
FIG. 5 is a perspective schematic illustration of the apparatus depicted in FIG. 4.

Reference is now made to FIGS. 4 and 5 of the drawings. In these Figures, like numerals indicate like parts as in FIG. 2. These figures differ from FIG. 2 by the addition of travelling stirrers 14. These stirrers preferably take the form of spiral or helical blades 15 supported on central axles 16 which preferably extend perpendicular to the surface of the conveyor belt 4. The stirrers may be driven through bevel gears by a common electric motor mounted on an overhead structure 17 which also supports the stirrers and is itself supported by rails (not shown) extending on each side of the conveyor belt from the point where the curd-whey mixture initially passes onto the conveyor to a position approximately one meter short of the weighted belt 12. The overhead structure 17 and accompanying stirrers may be moved in the directions indicated by the double headed arrows 5 by means of a pulley system (not shown) or any other convenient means.

The stirrers are adapted to sweep back and forward through any one portion of the travelling curd a number of times to maintain the curd in a loose state, thereby enabling the whey to pass from the mixture through or over the conveyor without detriment to the final product.

Preferably, the base of the sloping screen 3 has a backing plate 21 which is scalloped to permit each stirrer 14 to sweep right up to the point where the curd meets the conveyor belt 4. This feature can be seen particularly clearly in FIG. 4.

EXAMPLE

A curd/whey mixture obtained by a "short method" cheddaring process was pumped over an inclined screen. The free whey drained off and granular curd fell onto a slowly moving perforated conveyor belt. The temperature of the mixture at this point was 42°–43° C. and the moisture content was 50–54%. The loose curd formed a bed 30–35 cm deep on the conveyor belt. Within one minute of forming the bed, the loose curd was stirred by a bank of stirrers and intermittently stirred for 10–20 minutes thereafter to maintain a granular state and allow further drainage. The stirring action was such as to keep the curd loose, while mixing and levelling the curd, and preventing no more than 1° C. fall in temperature in the time. The moisture content of the curd following the stirring was 41–43%.

The curd was then allowed to settle and fuse for 3–8 minutes during which some further drainage took place. The depth of the curd on the conveyor was now 23–30 cm.

The pre-fused bed of curd was then subjected to pressure from a floating weighted belt assembly to apply 0.28–0.4 p.s.i. on the loose surface for 22–27 minutes. This pressure accelerated consolidation and closed the top surface. A shearing action was imparted to the curd by running the weighted belt at a speed about 12% greater than the speed of the conveyor belt in the same direction. At the end of the cheddaring the curd bed had been reduced in depth to 16–24 cm, the temperature of the curd was 41°–42° C. and the moisture content was 39.5–41.4%.

We claim:

1. Apparatus for draining residual whey from a previously drained and stirred cheese curd/whey mixture, comprising a conveyor belt for conveying cheese curd in the form of a substantially continuous mat to a cutting or milling station and a weighted shear assembly means for simultaneously applying a shear force substantially in the lengthwise extending direction of the conveyor belt and a compression force, said shear assembly being spaced from and overlying a portion of the conveyor belt, said weighted shear assembly and conveyor belt being arranged such that when the curd is conveyed by the conveyor belt beneath the weighted shear assembly in use, the curd is simultaneously subjected to the compression force and the shear force as it passes between the conveyor belt and shear assembly in use to expel the residual whey and accelerate fusion and fibrous development in the curd.

2. An apparatus as claimed in claim 1, wherein the weighted shear assembly means includes a weighted continuous belt arranged parallel to the conveyor belt.

3. An apparatus as claimed in claim 2 further comprising means for driving the weighted continuous belt about hollow cylindrical stainless steel rollers with the lower run of the weighted belt moving in the same direction as that of the upper run of the conveyor belt but at a different speed to that of the conveyor belt.

4. An apparatus as claimed in claim 3 wherein the weighted continuous belt travels at a faster speed than the conveyor belt.

5. An apparatus as claimed in claim 3 further comprising means for adjusting the force applied by the weighted belt.

6. An apparatus as claimed in claim 1 wherein the weighted shear assembly means includes a skid plate assembly in the form of a substantially rectangular stainless steel plate arranged with its lengthwise extending sides parallel to the conveyor belt.

7. An apparatus as claimed in claim 6 in which the plate has a curved edge facing towards the oncoming cheese curd so as to facilitate passage of the curd between the plate and the conveyor belt.

8. An apparatus as claimed in claim 1 further comprising means for predraining and stirring the cheese curd/whey mixture including a plurality of adjustably positioned stirrers adapted to travel backwards and forwards in the lengthwise extending direction of the conveyor belt in order to effect stirring of the curd/whey mixture so as to facilitate removal of whey from the curd prior to passage of the curd beneath the weighted shear assembly means.

9. An apparatus as claimed in claim 8 wherein each stirrer is in the form of a spiral or helical flat blade adapted for rotation about a central axis, generally arranged perpendicular to the conveyor belt and being adapted to stir the curd within about one minute of the curd leaving said means for draining said curd and meeting the conveyor belt.

10. An apparatus as claimed in claim 8 wherein the plurality of stirrers are arranged in a bank extending across the conveyor belt and supported by a common structure which moves on side rails in the forward and reverse directions to the direction of movement of the conveyor belt.

* * * * *